(12) United States Patent
Salo et al.

(10) Patent No.: US 6,704,735 B1
(45) Date of Patent: Mar. 9, 2004

(54) MANAGING OBJECT LIFE CYCLES USING OBJECT-LEVEL CURSOR

(75) Inventors: Timo J. Salo, Apex, NC (US); Kevin J. Williams, Colorado Springs, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/480,423

(22) Filed: Jan. 11, 2000

(51) Int. Cl.[7] ................................................ G06F 17/30
(52) U.S. Cl. ........................... 707/100; 707/3; 707/4
(58) Field of Search ........................... 707/3, 4, 5, 100, 707/10

(56) References Cited

U.S. PATENT DOCUMENTS 5,666,526 A * 9/1997 Reiter et al. ................ 395/602
5,787,436 A * 7/1998 Blackman et al. ......... 707/103 R
6,466,933 B1 * 10/2002 Huang et al. ................... 707/3

OTHER PUBLICATIONS

Kwok et al. (The Scalability of an Object Descriptor Architecture OODBMS). Aug. 1999.*
The Scalability of an Object Descriptor Architecture OODBMS. (Database Engineering and Application) Aug. 1999.*

* cited by examiner

Primary Examiner—Kim Vu
Assistant Examiner—Baoquoc N To
(74) Attorney, Agent, or Firm—Gregory M Doudnikoff; Marcia L Doubet

(57) ABSTRACT

A technique for managing life cycles of objects which are created by mapping layer software in response to retrieving data from a relational database. Object-level cursors are defined, where an object cursor is mapped to a database cursor for a particular cursored query. When the application traverses from one root object to another, the object-level cursor is advanced and memory used to store the objects corresponding to the previous subset of cursored rows is released, freeing memory space for a next set of objects corresponding to a next subset of cursored rows. The database cursor is also advanced to align with a row corresponding to the current root object to be processed by the application. Using this technique, result sets may be arbitrarily large without impacting system performance or efficiency.

15 Claims, 12 Drawing Sheets

FIG. 6C

Retrieving all rows for a root object using a database cursor

Database cursor after retrieving all rows for Department 1

| | | | |
|---|---|---|---|
| Dept 1 | Emp 1.1 | Addr 1.1.1 | ← 660a  670 |
| Dept 1 | Emp 1.2 | Addr 1.2.1 | ← 660b  671 |
| Dept 1 | Emp 1.2 | Addr 1.2.2 | ← 660c  672 |
| Dept 1 | Emp 1.3 | Addr 1.3.1 | ← 660d  673 |
| Dept 2 | Emp 2.1 | Addr 2.1.1 | ← 660e  674 |
| Dept 2 | Emp 2.2 | Addr 2.2.1 | |
| Dept 3 | Emp 3.1 | Addr 3.1.1 | |
| ... | ... | | |

Database cursor after retrieving all rows for Department 2

| | | | |
|---|---|---|---|
| Dept 1 | Emp 1.1 | Addr 1.1.1 | |
| Dept 1 | Emp 1.2 | Addr 1.2.1 | |
| Dept 1 | Emp 1.2 | Addr 1.2.2 | |
| Dept 1 | Emp 1.3 | Addr 1.3.1 | |
| Dept 2 | Emp 2.1 | Addr 2.1.1 | ← |
| Dept 2 | Emp 2.2 | Addr 2.2.1 | ← |
| Dept 3 | Emp 3.1 | Addr 3.1.1 | ← 660f |
| ... | ... | | |

Set object cursor to first position

MANAGING OBJECT LIFE CYCLES USING OBJECT-LEVEL CURSOR

BACKGROUND OF THE INVENTION

1. Field of the Invention

The present invention relates to the field of computer programming, and more particularly to a method, system, and computer program product for using object-level cursors to improve the efficiency of systems which map relational database retrieval results to objects.

2. Description of the Related Art

Relational database operations return results formatted as rows, where these rows correspond to fields from one or more tables of the underlying data model, as is well known in the art. In some software applications, the number of rows that will be returned from a retrieval operation (where these returned rows are referred to equivalently as a "result set") can be very large. For example, in a batch-oriented tax accounting application the number of rows returned for a query involving taxpayers could be hundreds of thousands or even millions. All processing systems have a memory limit, and thus it may be impossible to retrieve very large result sets into memory at one time for processing.

Prior art relational database systems have provided "cursors" to deal with this problem. The database system logically divides a result set into relatively small subsets, of small enough size to be read into the application's memory for processing. The system then maintains a database cursor as a logical pointer into the result set, where the cursor is moved from one subset of rows to another to keep track of which rows the application has already processed and which have not yet been retrieved for processing. This processing of subsets and advancing of the cursor is repeated until the entire result set has been processed. When the cursor is advanced, the memory that was used to hold the previous subset of data is released and thus is again available to the system. With this type of approach, a database retrieval result set can be arbitrarily large since there are no memory-related processing limitations.

Today, systems are often developed using an object-oriented language such as Java to build the application logic and a relational database to provide back-end storage for data. ("Java" is a trademark of Sun Microsystems, Inc.) Rather than dealing directly with the relational database, there is an increasing trend for applications to employ a mapping layer to translate between the object orientation of the application and the relational orientation of the database. When performing a retrieval operation, the mapping layer typically translates the relational rows retrieved by the database engine into objects, and returns these objects for processing by the application. Conversely, when the data store is to be updated as a result of the application's processing, the mapping layer typically translates objects sent by the application into relational row format for storing by the database engine. An example configuration of the components in a system employing this type of mapping function is shown in FIG. 1.

A common approach used by mapping layer software of this type for managing the life cycle of a created object is to bind the object's life cycle to the underlying database transaction. That is, once the mapping layer creates an object, the object will not be destroyed until the database transaction has completed. When the result set is large, this approach creates a problem. Even if a database cursor is used to stream over the result set, as described above, the objects created from the result set by the mapping layer still live in memory after the database cursor is advanced, since the entire result set is still within the scope of the underlying transaction. The memory used to hold the subset of the result set rows is released when the database cursor is advanced, but the corresponding memory used to hold the objects is not. Thus, the original problem simply moves from one component of the system to another, and the size of the result set is again constrained by the amount of memory available.

There are a number of scenarios in which this problem is compounded. A first such scenario is when a database cursor is used for pre-loaded, or "read-ahead", data—that is, when the data returned from a database retrieval operation includes data for not only the root of an object graph (i.e. where "object graph" refers to multiple objects, having interrelationships that form a graph structure) but also data for related objects that may be navigated to from the root. A second scenario is when a database cursor is used for retrieving a result set, and the application then retrieves related rows using independent queries. The problems resulting from these example scenarios will now be described in more detail.

As an example of the first scenario, consider an object model that has three classes Department, Employee, and Address, as shown in FIG. 2. Also assume that this object model is mapped to a relational database with a similar structure of tables, such that the database schema has three tables DepartmentTable, EmployeeTable, and AddressTable. A DepartmentTable row is related to one or more EmployeeTable rows (as indicated by the corresponding 1-to-many relationship depicted in FIG. 2) by a foreign key column in the EmployeeTable, where this foreign key specifies a DepartmentTable primary key. Also, an EmployeeTable row is related to one or more AddressTable rows in a similar manner. A cursored query can be constructed to return all DepartmentTable rows that match a certain criteria (such as "DepartmentTable.Dept="D*"") along with (1) the EmployeeTable rows which reference the selected department rows and (2) the AddressTable rows which reference the selected employee rows. In this case, there may be many rows of data for each root object (where in this example query, the root is a department) that is selected by the query. FIG. 3 illustrates a simple example where two departments "D1" and "D2" were selected by a cursored query. The corresponding root objects are D1 300 and D2 310. The result set 330 depicts three returned rows 340, 350, 360 for department D1 and two returned rows 370, 380 for department D2 (where this example result set represents a join of each of the three underlying tables and shows only a primary key value from each). As will be obvious, a result set will often contain many more rows and many more columns than illustrated in FIG. 3.

Using this example result set 330, the database cursor is first positioned 320a at the start of the result set. Suppose the mapping layer software described above structures the result set according to the root objects therein, such that the database cursor is advanced from one root object to the next. In this case, the mapping layer software will create objects representing rows 340, 350, and 360 and store these objects into the application's memory. When the application traverses from department D1 to department D2, the database cursor moves to position 320b. The mapping layer software will then create objects representing rows 370 and 380. If more than two root objects are represented by the result set, this process of moving the database cursor and creating new objects for each subset of the result set is repeated. As can be seen from this simple example, processing a result set that represents a fairly large number of objects (as will be typical during operation of many applications) will consume large amounts of memory for storing those objects.

As an example of the second scenario described above, suppose a cursored query retrieves only the Department and Employee rows as described with reference to FIG. 3, but does not retrieve Address rows (such that the result set 330 in this example does not contain the information depicted in the third column of FIG. 3). Further suppose that the database schema contains a Project table (and that its corresponding object model contains a Project class) for the project(s) an employee works on. After issuing the cursored query, suppose the application then processes the Department and Employee objects created by the mapping layer from the result set, and may selectively retrieve additional information related to these objects. For example, Address data may be retrieved for Employees, foreign key values may be used to retrieve an employee's manager row from the Employee table, project information may be retrieved for each Employee from the Project table, etc. Each such retrieval results in additional objects being created by the mapping layer, and each such related object further compounds the problem of managing the memory usage of the system.

Accordingly, what is needed is an improved technique for managing objects that are created for result sets retrieved in relational database operations.

SUMMARY OF THE INVENTION

An object of the present invention is to provide an improved technique for managing objects created in response to retrieving data from a relational database.

Another object of the present invention is to provide this technique by using a temporary object cache.

A further object of the present invention is to provide this technique by defining an object cursor which is mapped to the database cursor for a particular transaction.

Another object of the present invention is to provide this technique where the source of the retrieved data is a relational database, and where the destination of the data is an application written using an object-oriented programming language.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer-readable code for efficiently managing object life cycles in a computing environment. This technique comprises issuing a cursored query and processing one or more objects represented in one or more rows of a result set of the cursored query by selectively storing particular ones of the objects in a reusable object cache.

Processing the objects preferably further comprises: extracting the particular ones of the objects from the result set, wherein each of the extracted objects is related to a particular root object represented in the rows; storing the extracted objects in the object cache; positioning an object cursor to point to the particular root object; operating upon the stored objects, creating one or more changed objects; and advancing the object cursor. Advancing the object cursor further comprises writing the changed objects to a persistent object store and emptying the object cache following the writing operation. The processing may be repeated for each of one or more additional root objects represented in the rows. This repeating enables successively processing each of the root objects using the object cursor.

One or more additional objects related to one or more of the stored objects may be separately retrieved, and these separately retrieved objects may be added to the stored objects in the object cache.

The present invention will now be described with reference to the following drawings, in which like reference numbers denote the same element throughout.

BRIEF DESCRIPTION OF THE DRAWINGS

FIGS. 6A through 6C show a simple example of using the temporary object cache and object cursor defined by the present invention, and how a database cursor is moved to correspond to the object-level cursor.

DESCRIPTION OF THE PREFERRED EMBODIMENT

Figure 4:
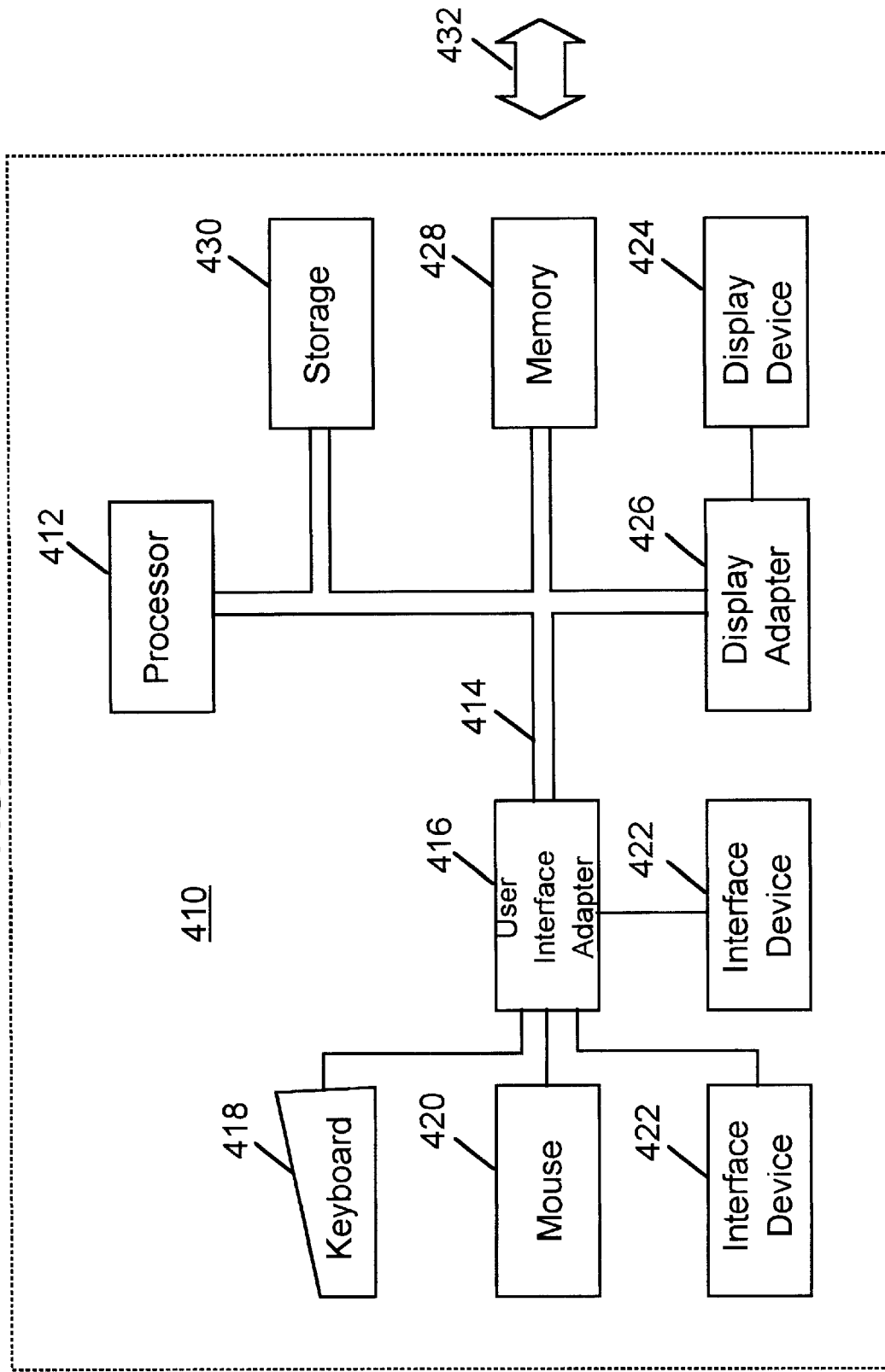
FIG. 4 is a block diagram of a computer workstation environment in which the present invention may be practiced.

FIG. 4 illustrates a representative workstation hardware environment in which the present invention may be practiced. The environment of FIG. 4 comprises a representative single user computer workstation 410, such as a personal computer, including related peripheral devices. The workstation 410 includes a microprocessor 412 and a bus 414 employed to connect and enable communication between the microprocessor 412 and the components of the workstation 410 in accordance with known techniques. The workstation 410 typically includes a user interface adapter 416, which connects the microprocessor 412 via the bus 414 to one or more interface devices, such as a keyboard 418, mouse 420, and/or other interface devices 422, which can be any user interface device, such as a touch sensitive screen, digitized entry pad, etc. The bus 414 also connects a display device 424, such as an LCD screen or monitor, to the microprocessor 412 via a display adapter 426. The bus 414 also connects the microprocessor 412 to memory 428 and long-term storage 430 which can include a hard drive, diskette drive, tape drive, etc.

The workstation 410 may communicate with other computers or networks of computers, for example via a communications channel or modem 432. Alternatively, the workstation 410 may communicate using a wireless interface at 432, such as a CDPD (cellular digital packet data) card. The workstation 410 may be associated with such other computers in a LAN or a WAN, or the workstation 410 can be a client in a client/server arrangement with another computer, etc. All of these configurations, as well as the appropriate communications hardware and software, are known in the art.

Figure 5:
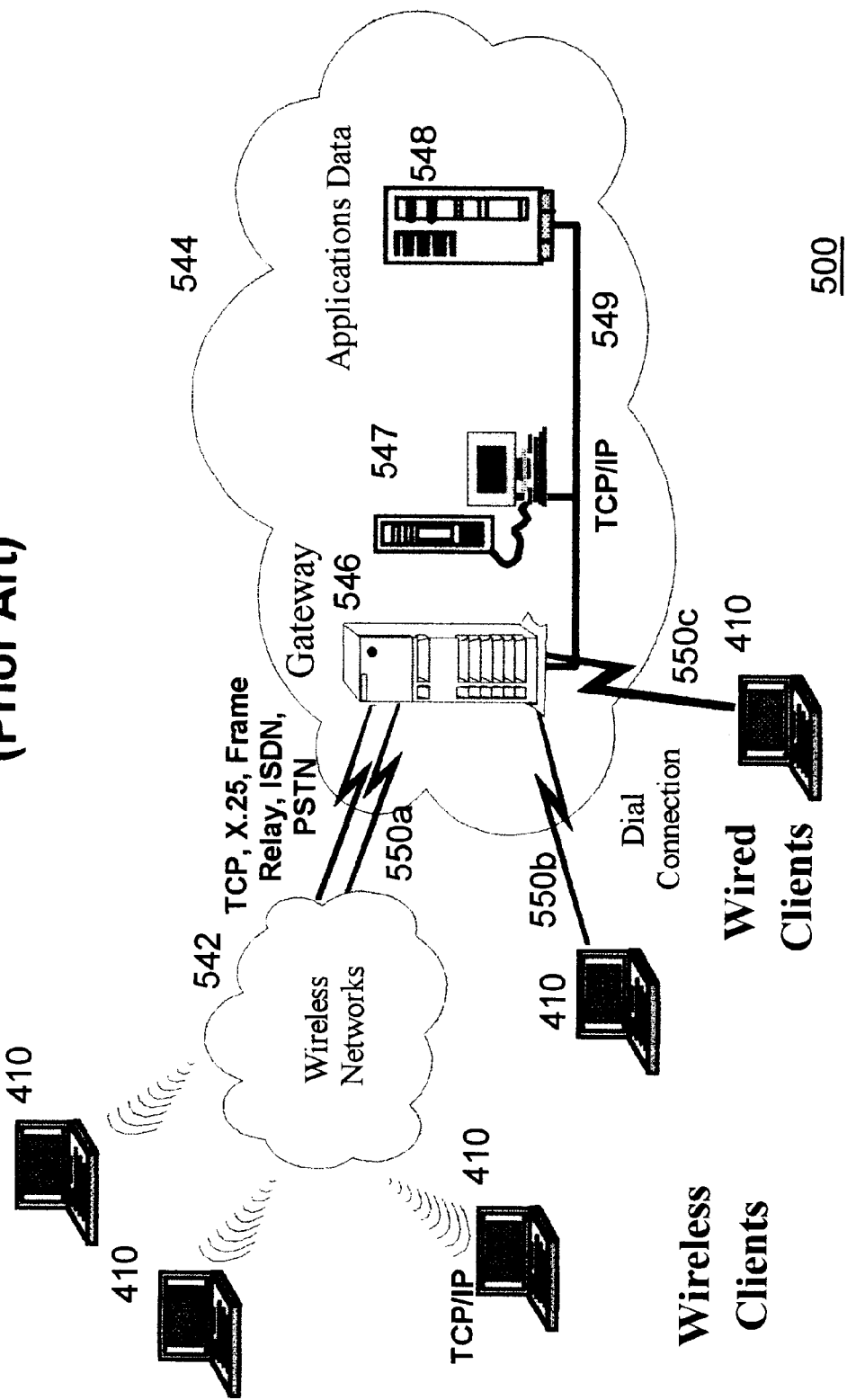
FIG. 5 is a diagram of a networked computing environment in which the present invention may be practiced.

FIG. 5 illustrates a data processing network 540 in which the present invention may be practiced. The data processing network 540 may include a plurality of individual networks, such as wireless network 542 and network 544, each of which may include a plurality of individual workstations 410. Additionally, as those skilled in the art will appreciate, one or more LANs may be included (not shown), where a LAN may comprise a plurality of intelligent workstations coupled to a host processor.

Still referring to FIG. 5, the networks 542 and 544 may also include mainframe computers or servers, such as a gateway computer 546 or application server 547 (which may access a data repository 548). A gateway computer 546 serves as a point of entry into each network 544. The gateway 546 may be preferably coupled to another network 542 by means of a communications link 550a. The gateway 546 may also be directly coupled to one or more workstations 310 using a communications link 550b, 550c. The gateway computer 546 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 546 may also be coupled 549 to a storage device (such as data repository 548). Further, the gateway 546 may be directly or indirectly coupled to one or more workstations 410.

Those skilled in the art will appreciate that the gateway computer 546 may be located a great geographic distance from the network 542, and similarly, the workstations 410 may be located a substantial distance from the networks 542 and 544. For example, the network 542 may be located in California, while the gateway 546 may be located in Texas, and one or more of the workstations 410 may be located in New York. The workstations 410 may connect to the wireless network 542 using a networking protocol such as the Transmission Control Protocol/Internet Protocol ("TCP/IP") over a number of alternative connection media, such as cellular phone, radio frequency networks, satellite networks, etc. The wireless network 542 preferably connects to the gateway 546 using a network connection 550a such as TCP or UDP (User Datagram Protocol) over IP, X.25, Frame Relay, ISDN (Integrated Services Digital Network), PSTN (Public Switched Telephone Network), etc. The workstations 410 may alternatively connect directly to the gateway 546 using dial connections 550b or 550c. Further, the wireless network 542 and network 544 may connect to one or more other networks (not shown), in an analogous manner to that depicted in FIG. 5.

Software programming code which embodies the present invention is typically accessed by the microprocessor 412 of the workstation 410 or server 547 from long-term storage media 430 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 428, and accessed by the microprocessor 412 using the bus 414. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

The computing environment in which the present invention may be used includes an Internet environment, an intranet environment, an extranet environment, or any other type of networking environment. These environments may be structured using a client-server architecture, or a multi-tiered architecture. In addition, the present invention may be used in computing environments that do not require a network.

The preferred embodiment of the present invention will now be discussed with reference to FIGS. 6 through 10.

In the preferred embodiment, the present invention is implemented as a computer software program. The program code of the preferred embodiment is implemented as objects (classes and methods) in the Java object-oriented programming language. However, the inventive concepts disclosed herein may be used advantageously with other object-oriented programming languages as well.

A Java development environment typically includes class libraries for use by developers when programming (i.e. developing applications) in the Java language. Class libraries are reusable sets of reusable classes which typically provide relatively high level functionality. A class is one of the basic building blocks of object-oriented languages such as Java, and comprises code which represents a combination of logic function and data. An object is an instance of a class. These concepts and techniques of Java programming are well known, and will not be discussed in depth herein.

The present invention defines a technique for improving the management of object life cycles using an object-level cursor. Object-level cursors, as defined herein, extend the concept of relational database cursors to the object space of an object-oriented application. The object-level cursor may be bound to a transaction in the application. U.S. patent application (Ser. No. 09/001,980, filed Dec. 31, 1997) entitled "Technique for Managing Objects which are the Target of Multiple Transactions in a Client/Server Environment", is now abandoned U.S. Pat. No. 6,298,478 entitled "Technique for Managing Enterprise JavaBeans™ which are the Target of Multiple Concurrent and/or Nested Transactions", U.S. patent application (Ser. No. 09/224,535, filed on Dec. 31, 1998) entitled "Technique for Managing Associations Between Enterprise JavaBeans™ which are the Target of Multiple Concurrent and/or Nested Transactions" is now abandoned, and U.S. Pat. No. 6,457,065 entitled "Transaction-Scoped Replication for Distributed Object Systems" define techniques with which transactions may be used to manage objects, Enterprise JavaBeans, and associations between Enterprise JavaBeans, and a technique for improving performance in distributed object systems by replicating objects within the scope of a transaction, respectively. The present invention may be used with the teachings of one or more of these inventions to manage object life cycles within the scope of a transaction. Alternatively, the present invention may be used advantageously with applications that are not adapted for using transaction concepts. ("JavaBeans" is a trademark of Sun Microsystems, Inc.)

The object-level cursor defined herein tracks the movement from one root object of a retrieved object graph to another root object as the application or application user navigates among the objects in a retrieved result set, effectively enabling the application to stream over the root objects resulting from a database retrieval operation. When database rows are brought into memory for processing by use of the database cursor, objects are created by mapping layer software (as in the prior art) to represent the rows that constitute a root object. In addition, objects that are related to this root object are created using the information in these rows, and are associated with the root object in an object graph structure. According to the present invention, these objects are held in an object cache until the object cursor is advanced, at which point these objects become obsolete and the memory used to hold them is released. In addition, any objects created by the application and any related objects retrieved by the application with additional queries as it executes are also held in this object cache. Use of the object-level cursor therefore provides a convenient and efficient technique for freeing up the storage used to hold these objects as well. The life cycle of the objects therefore no longer coincides with the underlying database operation (such as a transaction), as in the prior art approach, but rather is now bound to the object-level cursor defined according to the present invention. (The concept of relational database cursors is well known to those skilled in the art, and will not be described in detail herein. In a client/server or multi-tiered environment, databases with which cursored queries may be used may be maintained in, for example, the data repository 548 of FIG. 5 or the long term storage 430 of FIG. 4.)

Figure 1:
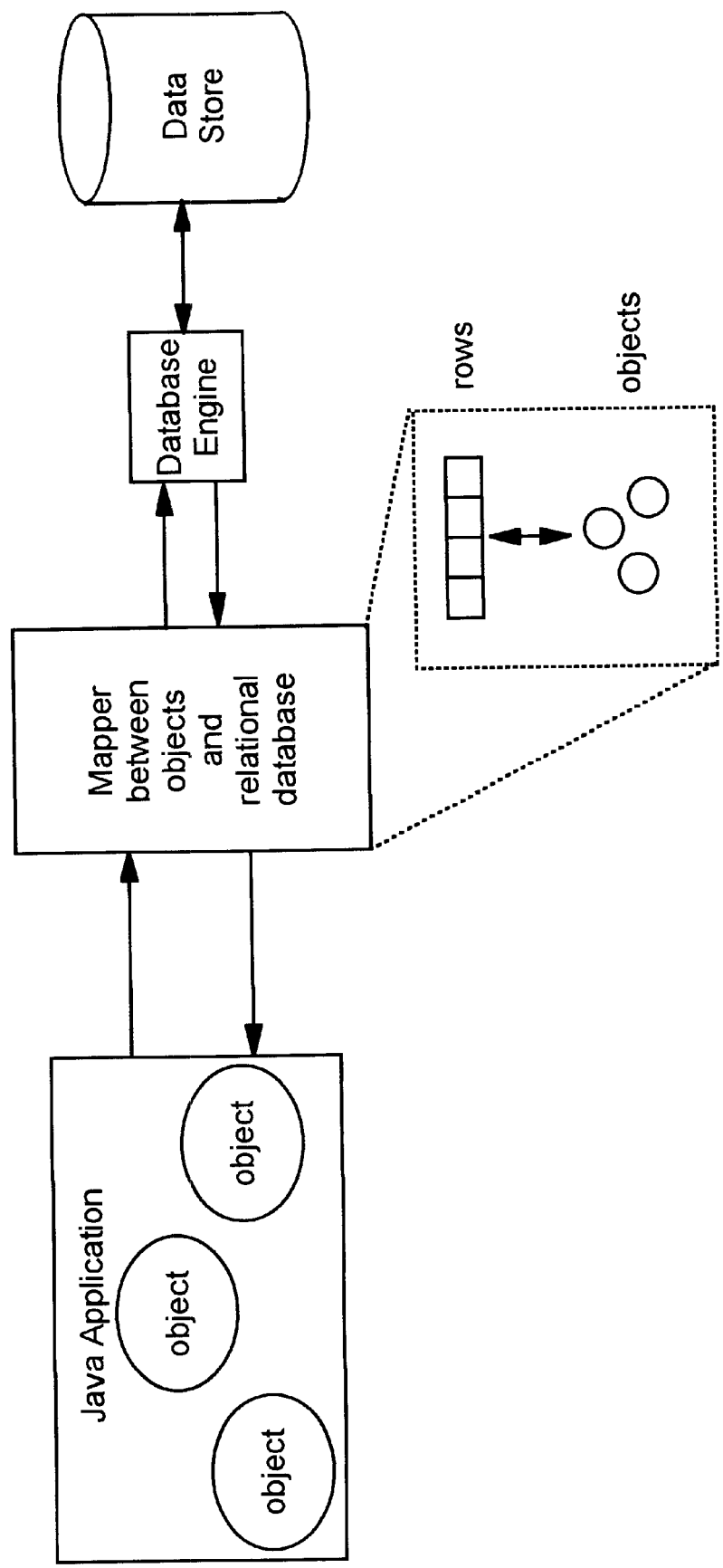
FIG. 1 illustrates an example configuration of the components in a prior art system employing a mapping function between an object-oriented application program and a relational database engine.
Figure 2:
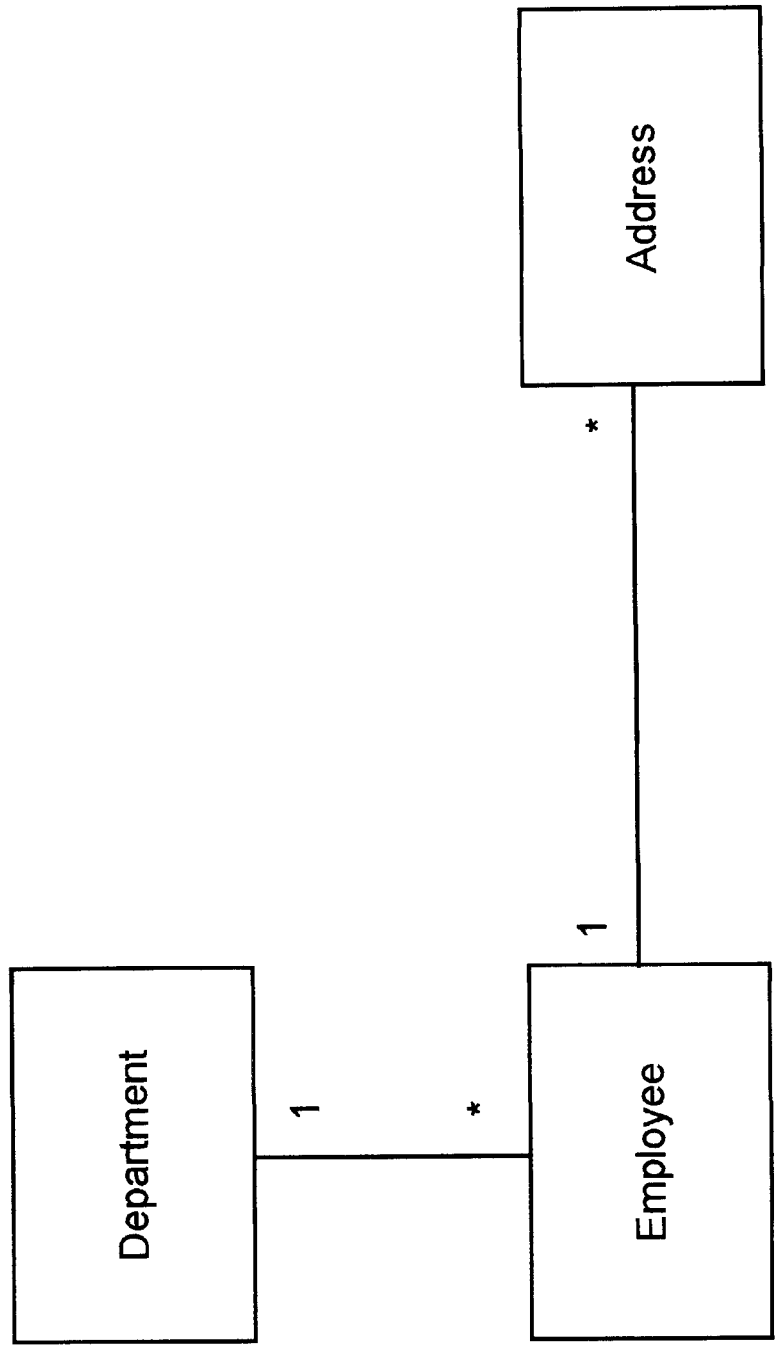
FIG. 2 depicts a simple object model having three classes which correspond to three tables in a relational database schema.
Figure 3:
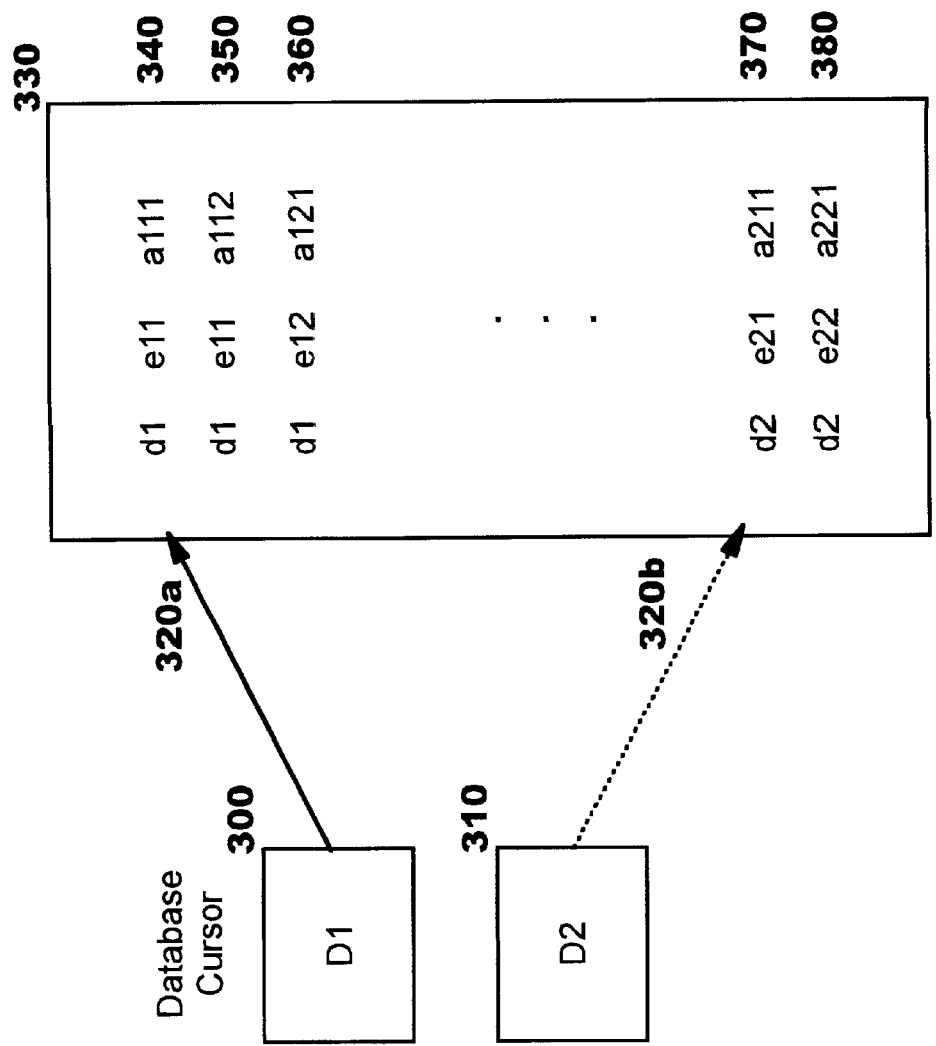
FIG. 3 illustrates an example of using a database cursor to stream over a result set selected by a cursored query, according to the prior art.
Figure 6A:
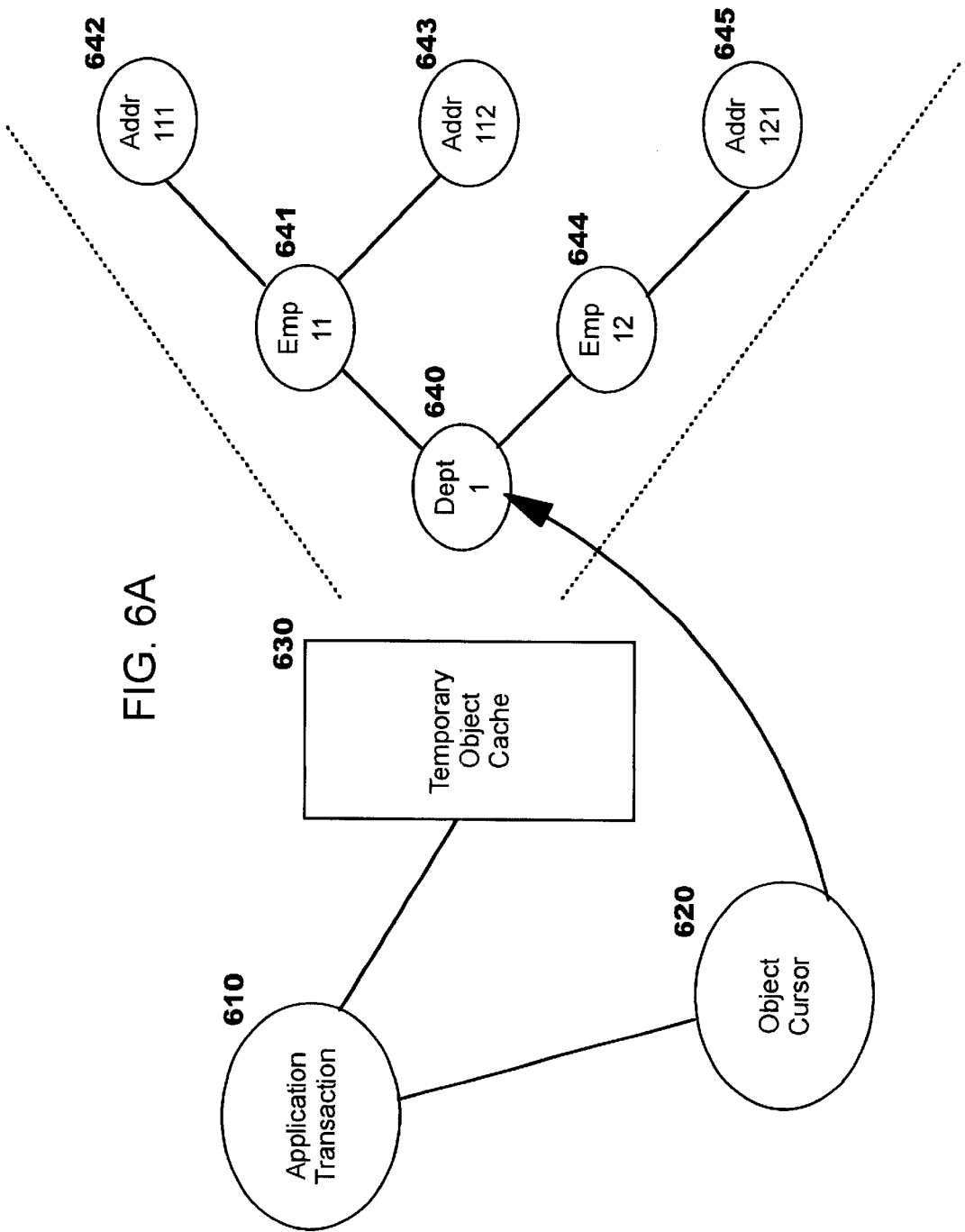

In a particular result set, there may be many rows of data that correspond to a single root object, as previously discussed with reference to root objects 300, 310 in the example of FIG. 3. This may occur when a database retrieval pre-loads data that the application is likely to be using, according to a read-ahead scheme that attempts to minimize the number of database accesses required during execution. Or, this may occur simply because a record in one database table has been joined with many records from another table. FIG. 6A depicts an example of using the object cache and object cursor defined by the present invention to manage the life cycle of objects that have been created when a row corresponding to a first root object has been read and the objects associated with this row have been created. The result set from which these objects were created may correspond to an application transaction 610, or to other application operations not structured as transactions, as previously discussed. Object 640 is the root of the current object graph held in object cache 630, and has descendant objects 641 through 645 in this graph. This object graph represents the information retrieved from the database for object 300 as depicted in rows 340, 350, 360 of FIG. 3. Object 640 has been created to represent information from the DepartmentTable; objects 641 and 644 represent information from the EmployeeTable; and objects 642, 643, and 645 represent information from the AddressTable. (For example, row 340 has been used to create the objects in path 640, 641, 642; row 350 has been used to create the objects in path 640, 641, 643; etc.

Figure 6B:
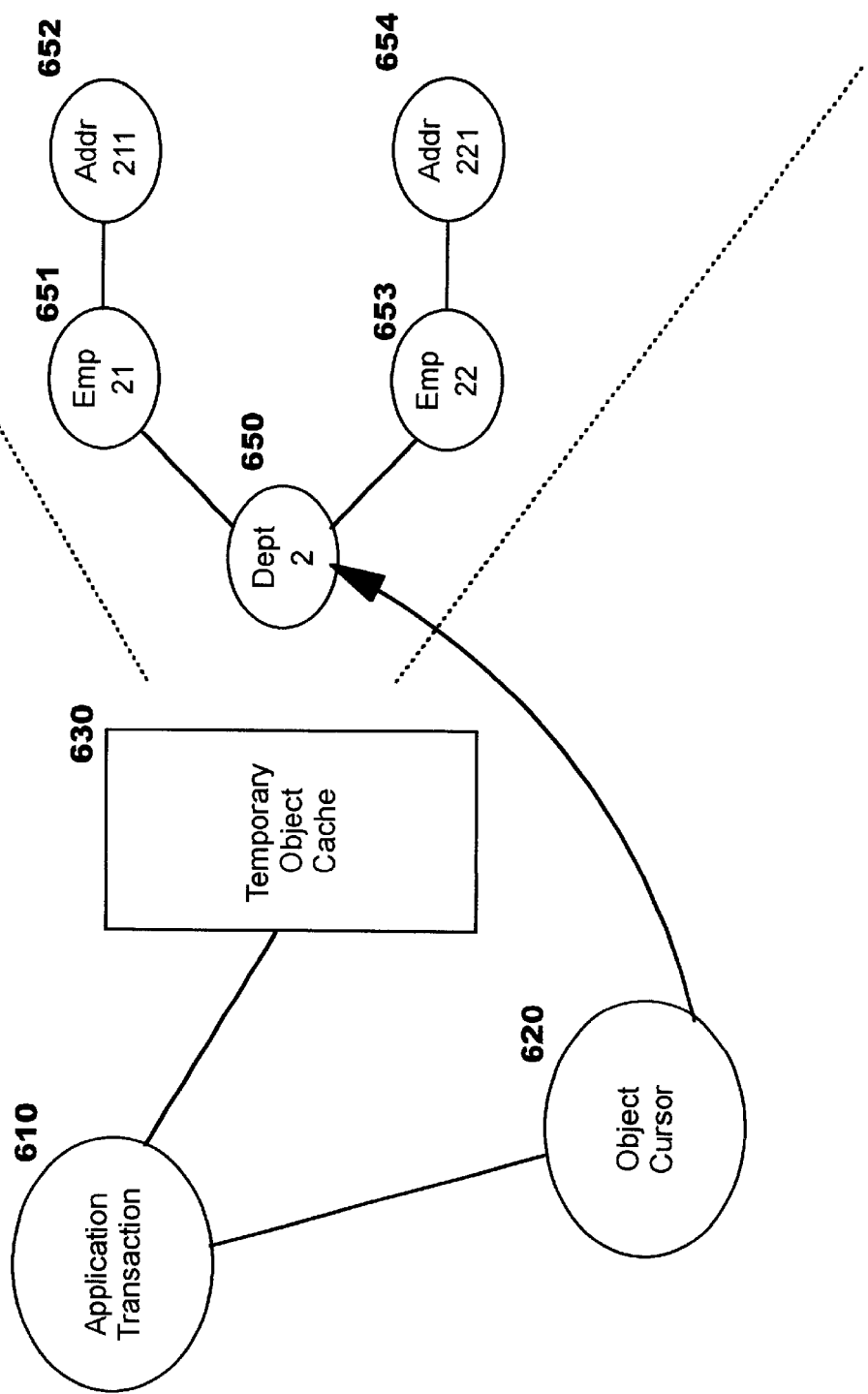

In FIG. 6A, object-level cursor 620 identifies root object 640 as being the current root object. While the object-level cursor of the present invention points to this root object 640, the objects held in object cache 630 of FIG. 6A are available for processing by the application. In addition, any new objects created or separately retrieved while the application processes the current root object or its descendant objects are also stored in the object cache 630 in the appropriate object graph location. (For example, if the application retrieves a Project row for Employee object 641 and Employee object 644, an additional child object containing Project information will be added to the object graph for objects 641 and 644.) When the application traverses to the next root object, all new and modified objects stored in the object cache are written back to the persistent store, the object cache is flushed, and the memory which was used to store objects at the object cursor's previous position is reclaimed. The object-level cursor is then advanced to point to the next root object, as depicted in FIG. 6B where the current root object is now object 650. Object 650 and its descendant objects 651 through 654 correspond to root object 310 of FIG. 3, and the information represented in rows 370 and 380. Finally, the database cursor must be advanced as many rows in the result set as is necessary to read rows for the root object and its related graph. Thus, the same object cache which was used to store objects associated with root object 300 (see FIG. 6A) is efficiently reused to store objects associated with root object 310 (see FIG. 6B).

FIG. 6C depicts of the manner in which the object-level cursor of the present invention is advanced relative to the database cursor. When the object-level cursor advances from one root object to the next, the database cursor must be advanced a variable number of rows, as required to point to the next root object. According to the preferred embodiment, the database cursor is advanced such that it points to the first row for the root object beyond the root object currently being pointed to by the object-level cursor. After the cursored query executes, the database cursor is initially pointing 660a to the first row of the example result set, which contains the first row for the first root object Department D1 (depicted in FIG. 6C as "Dept 1"). This row, along with the following three rows, corresponds to root object D1 and its related object graph. Thus as the objects from these rows are extracted and stored in the object cache for processing with the object-level cursor pointing to root object D1, the database cursor is advanced past these four rows to point to the first row for the next root object D2 (see element 660e). (This process will be described in more detail below, with reference to FIGS. 8 through 10.) Similarly, as the root object D2 and its related objects are extracted from the next two rows, the object-level cursor is set to point to root object D2 while the database cursor is advanced to point to the first row for the next root object D3 (see element 660f).

Figure 7:
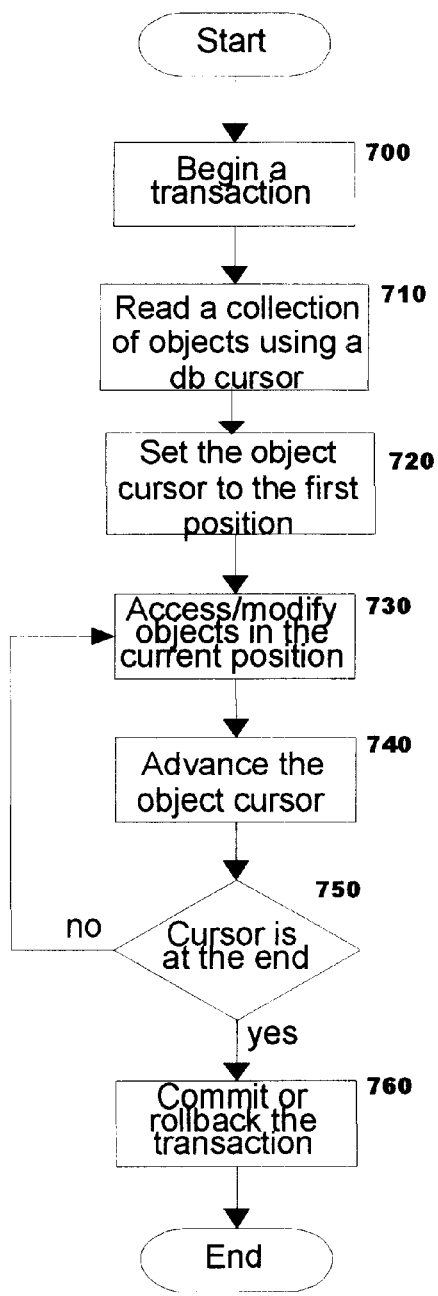
FIGS. 7 through 10 provide flowcharts illustrating the logic with which a preferred embodiment of the present invention may be implemented.
Figure 8:
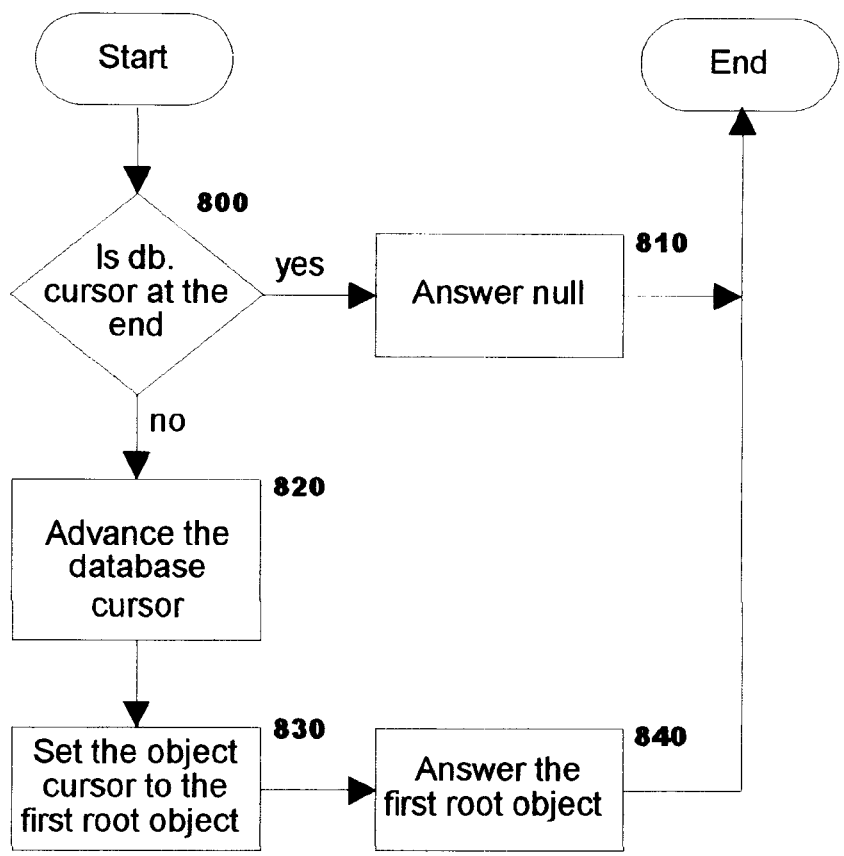
Figure 9:
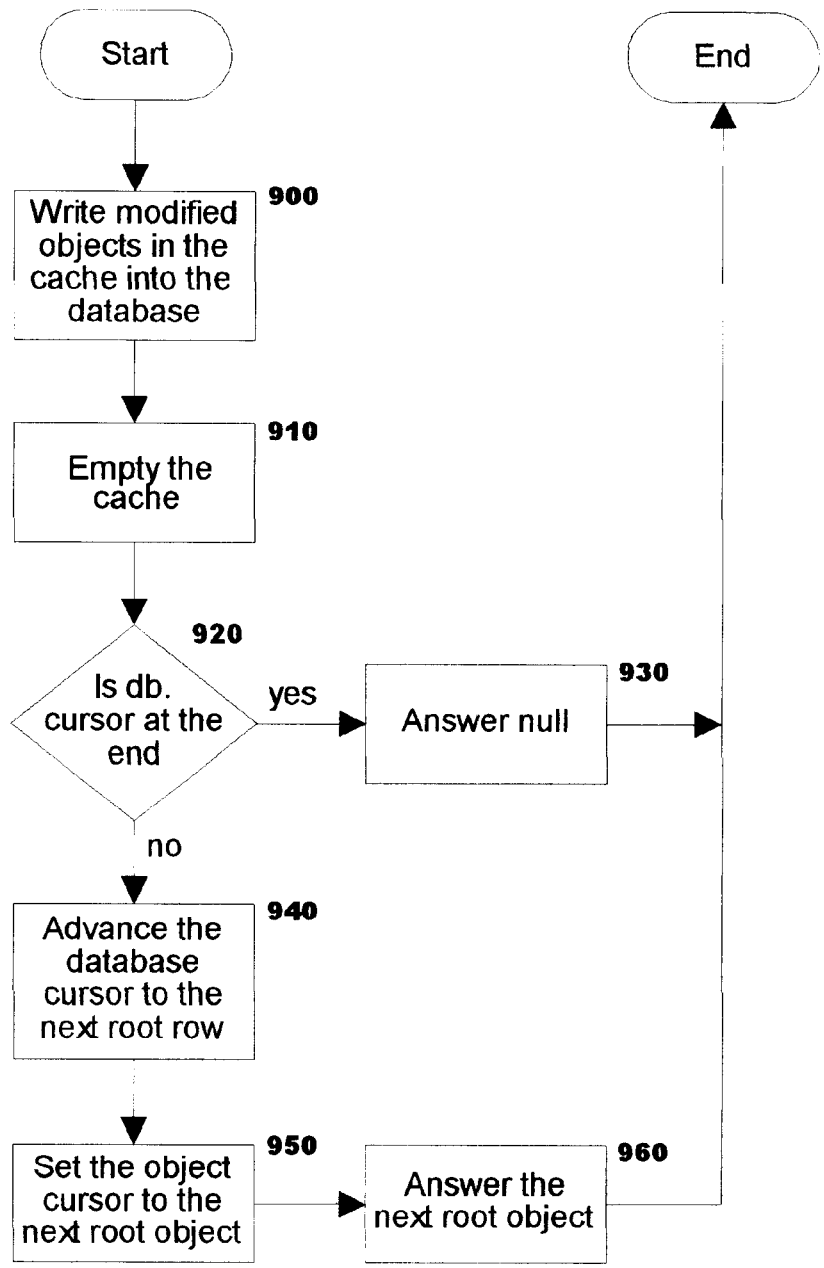
Figure 10:
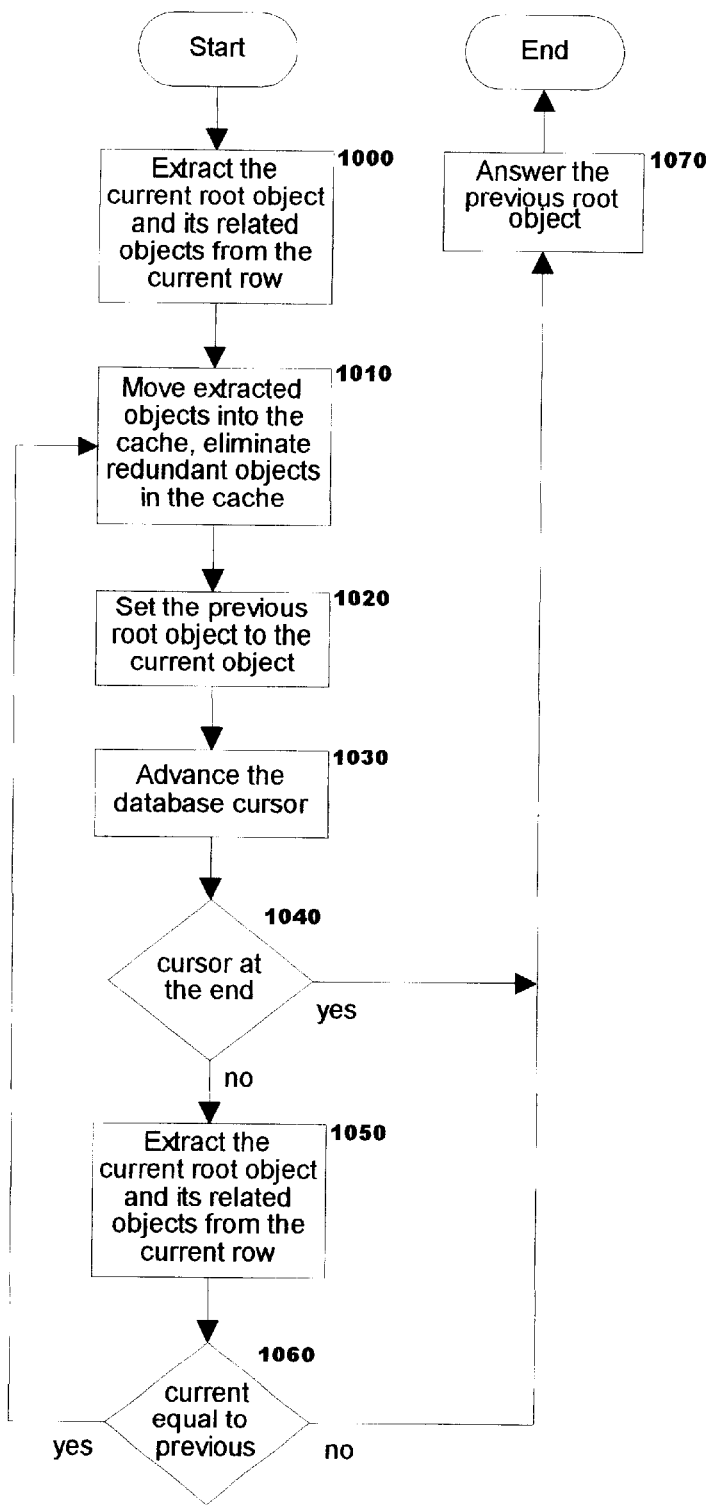

FIG. 7 depicts the logic with which the present invention may be advantageously used within an application structured to use transactional concepts. FIGS. 8 through 10 depict the logic with which a preferred embodiment of the present invention may be implemented to provide the object life-cycle management technique disclosed herein. (An implementation of the present invention may use FIGS. 8 through 10 without using the approach depicted in FIG. 7.)

The processing of FIG. 7 begins at Block 700, where an executing application begins a new transaction. Block 710 then reads a collection of objects to be used in this transaction from a database using a cursored query (which sets a database cursor using techniques which are known in the art). Block 720 then sets the object-level cursor of the present invention to point to the object representing the first position of the result set (i.e. the first root object) from the database retrieval operation. This process is depicted in more detail in FIG. 8, and includes bringing all the objects related to this root object into the object cache. The application then accesses and modifies selected ones of the objects (according to the needs of the application) in the object cache as pointed to by the current object-level cursor (Block 730), and may create or retrieve additional related objects into the object cache as well. When operations on this set of objects is finished, Block 740 indicates that the object-level cursor is advanced to the next root object. This process is described in more detail in FIG. 9. A test is then made at Block 750 to see if the cursor is at the end. (This test has a positive result when the database cursor points to the end of the result set corresponding to the retrieval operation of Block 710.) If not, then control returns to Block 730 to process the new set of objects which are now pointed to by the object-level cursor and which have replaced the previous set of objects in the object cache, according to the operation of FIGS. 9 and 10. Otherwise, when the test at Block 750 has a positive result, processing continues to Block 760 where the transaction is either committed or rolled back using techniques such as those described in the above-referenced patents. The processing of FIG. 7 is then complete for this transaction.

FIG. 8 depicts a preferred embodiment of the logic used to initially set the object-level cursor of the present invention. (When used according to the approach shown in FIG. 7, the logic of FIG. 8 is invoked from Block 720.) Block 800 asks whether the database cursor points to the end of the result set retrieved by the current cursored query operation. If so, then a null value is returned (Block 810) to the invoking logic, and the processing of FIG. 8 ends. Otherwise, Block 820 initializes the object cache for the first root object and advances the database cursor to point to the row corresponding to the next root object (as previously discussed with reference to the example in FIG. 6C). This process is depicted in detail in FIG. 10. Because this is the first time the result set is being accessed, the database cursor points to the start of the result set upon this entry to the processing of FIG. 10.

Block 830 then sets the object cursor to point to the first root object (which forms the root of the object graph in the object cache, and which has been created according to FIG. 10). This first root object is then returned to the invoking logic (Block 840).

FIG. 9 depicts a preferred embodiment of the logic used to advance the object-level cursor of the present invention.

(When used according to the approach shown in FIG. 7, the logic of FIG. 9 is invoked from Block 740.) Upon reaching Block 900, processing of the objects currently existing in the object cache has completed. Block 900 therefore writes the modified objects from the object cache (including any newly-created objects stored therein) to the persistent store. Block 910 then empties the object cache, thereby enabling it to be re-used if there are more objects to be processed.

Block 920 asks whether the database cursor points to the end of the result set retrieved by the current cursored query operation. If so, then a null value is returned (Block 930) to the invoking logic (which will cause Block 750 of FIG. 7 to have a positive result), and the processing of FIG. 9 ends. Otherwise, Block 940 advances the database cursor to point to the row corresponding to the next root object (as previously discussed with reference to the example in FIG. 6C). This process is depicted in detail in FIG. 10.

Block 950 then sets the object cursor to point to the next root object (which forms the root of the object graph in the object cache, and which has been created according to FIG. 10). This root object is then returned to the invoking logic (Block 960).

FIG. 10 illustrates a preferred embodiment of the logic with which the database cursor is advanced according to the present invention. (Note that when a cursored query is executed, the database cursor is automatically set to point to the first row in the result set, according to the prior art. Therefore, it is not necessary to explicitly position the database cursor to point to this first row prior to the first execution of the logic of FIG. 10.) At Block 1000, the root object and its related objects are extracted from the current row of the subset of the result set which was returned by the cursored query (i.e. the row pointed to by the database cursor). Preferably, existing mapping layer software is used for this process. Block 1010 moves the extracted objects into the object cache of the present invention, eliminating any redundant objects that may have been created. Block 1020 then sets a "previous root object" pointer to point to the current root object.

Block 1030 advances the database cursor to point to the next row of the result set. Block 1040 then checks to see if the database cursor is now pointing to the end of the result set. If so, the object pointed to by the previous root object pointer (which also points to the current object in this situation) is returned (Block 1070) for processing by the invoking logic. Otherwise, when there are more rows in the result set, Block 1050 extracts the objects from the next row. Block 1060 tests whether the root object extracted from this row is the same root object pointed to by the previous root object pointer. If so, control returns to Block 1010 where the extracted objects are added to the object cache. When Block 1060 has a negative result, control transfers to Block 1070 to return the object pointed to by the previous root object pointer (and the objects extracted by Block 1050 are discarded).

The processing of FIG. 10 may be better understood by reference to the example of FIG. 6C. First, the Department, Employee, and Address objects are extracted (Block 1000) from the row 670 pointed to by database cursor 660a, and added (Block 1010) to an empty object cache. The previous root object pointer is then set (Block 1020) to point to the root object (representing "Dept 1") for this department. The database cursor is then moved 660b (Block 1030) to point to the second row 671. (Techniques for advancing database cursors, and the commands with which this is accomplished, are known in the art.) Because the database cursor is not at the end (Block 1040), the objects for row 671 are then extracted (Block 1050). The root object of this row 671 is the same as the root object for the previous row 670 (i.e. the object for "Dept 1"), and thus Block 1060 will return control to Block 1010 to add the new employee and address objects from row 671 to the object cache. The processing of Block 1020 through 1060, followed by Block 1010, will repeat for extracting the objects from rows 672 and 673 (and moving 660c, 660d the database cursor). After Block 1010 extracts the objects for row 673, the previous root object pointer remains pointing to "Dept 1" (Block 1020). Block 1030 moves the database cursor so that it points to row 674, which is a row for a different root object "Dept 2". Encountering a negative result again at Block 1040, Block 1050 extracts the objects from row 674. On this iteration through Block 1060, the test has a negative result, indicating that all the objects related to the root object being processed ("Dept 1") are already stored in the object cache. Thus, Block 1070 returns the pointer which points to this root object. Upon a subsequent invocation of the logic of FIG. 10, Block 1000 will begin by using the new value 660e of the database cursor. Operation of this logic repeats until all the rows in the result set have been processed.

The discussions of persistent storage herein are in terms of using a "database". However, it is to be understood that this is for ease of reference. Any type of persistent store, however organized (such as a file system), may be used without deviating from the inventive concepts disclosed herein.

While the present invention has been described relative to retrieving persistent data from a relational database using Java programming, the basic techniques described herein may be applicable to many types of programming languages and many types of databases or data repositories. Thus, while the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and such modifications as fall within the spirit and scope of the invention.

We claim:

1. A computer program product for efficiently managing object life cycles, said computer program product embodied on a computer-readable medium readable by a computing device in a computing environment and comprising:

computer-readable program code means for retrieving a plurality of rows from a non-object-oriented data store, wherein each retrieved row contains data representing a changeable root object and one or more related objects; and computer-readable program code means for populating an object cache with the objects represented by the data in the retrieved rows, under control of an object cursor, further comprising computer-readable program code means for:

pointing a data store cursor to a first one of the retrieved rows;

determining which root object is represented by the data in the pointed-to row, and calling this determined root object a current root object;

iteratively repeating, until determining that the root object represented by the data in the pointed-to row is different from the current root object, the steps of:

creating objects for the current root object and the one or more related objects represented by the data in the pointed-to row, unless the object already exists in the object cache, and storing these created objects in the object cache; and advancing the data store cursor to point to the next-sequential one of the retrieved rows, if any; and using the objects in the object cache, as needed by an application program, until either (1) the application program completes or (2) a different root object and its related objects are needed by the application program.

2. A system for efficiently managing object life cycles in a computing environment, comprising:

means for retrieving a plurality of rows from a data store, wherein each retrieved row contains data representing a changeable root object and one or more related objects; and means for populating an object cache with the objects represented by the data in the retrieved rows, under control of an object cursor, further comprising means for:

pointing a data store cursor to a first one of the retrieved rows;

determining which root object is represented by the data in the pointed-to row, and calling this determined root object a current root object;

iteratively repeating, until determining that the root object represented by the data in the pointed-to row is different from the current root object, the steps of:

creating objects for the current root object and the one or more related objects represented by the data in the pointed-to row, and storing unique ones of these created objects in the object cache; and advancing the data store cursor to point to the next-sequential one of the retrieved rows, if any; and using the objects in the object cache, as needed by an application program, until either (1) the application program completes or (2) a different root object and its related objects are needed by the application program.

3. A method for efficiently managing object life cycles in a computing environment, comprising the steps of:

retrieving a plurality of rows from a data store, wherein each retrieved row contains data representing a changeable root object and one or more related objects; and populating an object cache with the objects represented by the data in the retrieved rows, under control of an object cursor, further comprising the steps of:

pointing a data store cursor to a first one of the retrieved rows;

determining which root object is represented by the data in the pointed-to row, and calling this determined root object a current root object;

iteratively repeating, until determining that the root object represented by the data in the pointed-to row is different from the current root object, the steps of:

creating objects for the current root object and the one or more related objects represented by the data in the pointed-to row, unless the object already exists in the object cache, and storing these created objects in the object cache; and advancing the data store cursor to point to the next-sequential one of the retrieved rows, if any, and using the objects in the object cache, as needed by an application program, until either (1) the application program completes or (2) a different root object and its related objects are needed by the application program.

4. The computer program product according to claim 1, further comprising computer-readable program code means for reusing the object cache for the different root object and its related objects.

5. The computer program product according to claim 4, wherein the computer-readable program code means for reusing the object cache further comprises computer-readable program code means for:

persisting, to the data store, any of the objects stored in the object cache that were changed when used by the application program;

clearing the stored objects from the object cache;

calling the root object represented by the data in the pointed-to row the current root object; and repeating operation of the steps of (1) iteratively repeating and (2) using the objects.

6. The computer program product according to claim 1, further comprising computer-readable program code means for:

creating, by the application program, one or more additional objects that are related to at least one of the objects in the object cache; and adding the created objects to the object cache.

7. The computer program product according to claim 1, further comprising computer-readable program code means for:

retrieving, upon request of the application program, one or more additional rows from the data store, wherein each of the additional rows contains data representing one or more objects that are related to at least one of the objects in the object cache;

creating objects for each of the one or more objects represented by the data in the additional rows, unless the object cache already contains the objects; and adding the created objects to the object cache.

8. The system according to claim 2, further comprising means for reusing the object cache for the different root object and its related objects.

9. The system according to claim 8, wherein the means for reusing the object cache further comprises means for:

persisting, to the data store, any of the objects stored in the object cache that were changed when used by the application program;

clearing the stored objects from the object cache;

calling the root object represented by the data in the pointed-to row the current root object, and repeating operation of the steps of (1) iteratively repeating and (2) using the objects.

10. The system according to claim 2, further comprising means for:

creating, by the application program, one or more additional objects that are related to at least one of the objects in the object cache; and adding the created objects to the object cache.

11. The system according to claim 2, further comprising means for:

retrieving, upon request of the application program, one or more additional rows from the data store, wherein each of the additional rows contains data representing objects related to at least one of the objects in the object cache;

creating objects for the objects represented by the data in the additional rows, unless the object cache already contains the objects; and adding the created objects to the object cache.

12. The method according to claim 3, further comprising the step of reusing the object cache for the different root object and its related objects.

13. The method product according to claim 12, wherein the reusing step further comprises the steps of:

persisting, to the data store, any of the objects stored in the object cache that were changed when used by the application program;

clearing the stored objects from the object cache;

calling the root object represented by the data in the pointed-to row the current root object; and repeating operation of the steps of (1) iteratively repeating and (2) using the objects.

14. The method according to claim 3, further comprising the steps of:

creating, by the application program, one or more additional objects that are related to at least one of the objects in the object cache; and adding the created objects to the object cache.

15. The method according to claim 3, further comprising the steps of:

retrieving, upon request of the application program, one or more additional rows from the data store, wherein each of the additional rows contains data representing objects related to at least one of the objects in the object cache;

creating objects for the objects represented by the data in the additional rows, unless the object cache already contains the objects; and adding the created objects to the object cache.

* * * * *